US006669114B1

(12) United States Patent
Williams et al.

(10) Patent No.: US 6,669,114 B1
(45) Date of Patent: Dec. 30, 2003

(54) ACTUATOR AND HANDLE FOR A PAINT SPRAYER

(75) Inventors: Mary Lynn Williams, Brentwood, TN (US); Robert Kyle Whitaker, Mt. Juliet, TN (US); Kinshun Yan, New York, NY (US); William H. Valls, Loveland, OH (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 0 days.

(21) Appl. No.: 10/192,470

(22) Filed: Jul. 10, 2002

(51) Int. Cl.[7] .............................................. A01G 25/14

(52) U.S. Cl. ...................... 239/375; 239/378; 239/526; 16/431

(58) Field of Search ................................ 239/525, 526, 239/378, 375; 16/436, 430, 431, DIG. 12

(56) References Cited

U.S. PATENT DOCUMENTS

| | | | | | |
|---|---|---|---|---|---|
| 817,819 | A | | 4/1906 | Walkup | |
| 1,191,751 | A | | 7/1916 | Walkup | |
| 1,272,438 | A | * | 7/1918 | Heinrich | 239/416.4 |
| 1,899,222 | A | | 2/1933 | Werder | |
| 1,900,668 | A | | 3/1933 | Roselund | |
| 1,988,979 | A | | 1/1935 | Campbell | |
| 1,992,426 | A | * | 2/1935 | Herbsman et al. | 239/104 |
| 2,126,718 | A | | 8/1938 | Batenburg | |
| 2,372,678 | A | | 4/1945 | McKay | |
| 2,626,185 | A | * | 1/1953 | Roselund | 239/117 |
| 2,743,959 | A | | 5/1956 | Nelson et al. | |
| 3,367,578 | A | * | 2/1968 | Juvinall et al. | 239/15 |
| 3,507,309 | A | * | 4/1970 | Johnson | 141/18 |
| 3,565,344 | A | | 2/1971 | Takei et al. | |
| D234,838 | S | * | 4/1975 | Culling | D22/118 |
| D235,063 | S | | 5/1975 | Gunzel et al. | |
| D235,544 | S | | 6/1975 | Bippus et al. | |
| 3,892,359 | A | | 7/1975 | Dwyer, Jr. et al. | |
| D237,796 | S | | 11/1975 | Wagner | |
| 3,931,914 | A | | 1/1976 | Hosaka et al. | |
| 4,030,665 | A | | 6/1977 | Koyama | |
| D251,382 | S | | 3/1979 | Reed | |
| 4,168,788 | A | | 9/1979 | Quinn | |
| 4,176,793 | A | | 12/1979 | Heinrich | |
| 4,572,438 | A | * | 2/1986 | Traylor | 239/708 |
| D286,426 | S | | 10/1986 | Lin | |
| 4,628,644 | A | | 12/1986 | Somers | |
| 4,693,423 | A | | 9/1987 | Roe et al. | |
| D295,214 | S | | 4/1988 | Miller | |
| D307,463 | S | | 4/1990 | Fushiya et al. | |
| D318,317 | S | | 7/1991 | Norman | |
| 5,150,841 | A | | 9/1992 | Silvenis et al. | |
| D331,095 | S | | 11/1992 | Steinberg | |
| 5,332,156 | A | | 7/1994 | Wheeler | |
| 5,623,974 | A | | 4/1997 | Losenno et al. | |
| 5,657,909 | A | | 8/1997 | Barriac | |
| 5,718,668 | A | | 2/1998 | Arnett et al. | |
| D397,420 | S | | 8/1998 | Campbell | |

(List continued on next page.)

*Primary Examiner*—Gregory L. Huson
*Assistant Examiner*—Amanda R. Flynn
(74) *Attorney, Agent, or Firm*—Jones Day

(57) ABSTRACT

A paint sprayer for sprayer a fluid includes a pump housing, an electrical housing having a motor and a switch, a handle coupled to the pump housing, a paint cup coupled to the handle, and a mechanical actuator coupled to the pump housing for operating the motor. The actuator has a first portion positioned in the vicinity of the exterior of the pump housing and a second portion that extends into the pump housing. The second portion is configured to engage the switch in the electrical housing to operate the motor. The handle is an elongated member having a top end and a bottom end, with a generally rectangular cross-section at the top end and a generally circular cross-section at the bottom end.

13 Claims, 6 Drawing Sheets

U.S. PATENT DOCUMENTS

| | | | | | |
|---|---|---|---|---|---|
| 5,794,854 | A | | 8/1998 | Yie | |
| D432,372 | S | | 10/2000 | Iaciofano et al. | |
| 6,152,386 | A | | 11/2000 | Bullock et al. | |
| 6,168,093 | B1 | | 1/2001 | Greer, Jr. et al. | |
| D451,792 | S | | 12/2001 | Siebert et al. | |
| 6,336,254 | B1 | * | 1/2002 | Graff et al. | 239/119 |
| D461,226 | S | | 8/2002 | Hunter | |
| 6,502,763 | B1 | * | 1/2003 | McCann | D22/118 |
| 6,502,766 | B1 | | 1/2003 | Streutker et al. | |
| 2002/0011531 | A1 | | 1/2002 | DiMaggio et al. | |

* cited by examiner

ACTUATOR AND HANDLE FOR A PAINT SPRAYER

FIELD OF THE INVENTION

The claimed invention relates to a paint sprayer. In particular, the invention concerns a hand-held airless paint sprayer having an ergonomically designed handle and a mechanical actuator.

BACKGROUND OF THE INVENTION

Currently known hand-held paint sprayers exert extensive stress on muscles of the arm, particularly on the weaker muscles of the arm, such as those in the wrist. An airless paint sprayer typically utilizes several parts, including an electrical housing and motor, a pump housing and pump, a paint tank (also commonly referred to as a paint cup), a handle, a tip, an internal fluid passage through which paint or cleaning solutions may flow, and controls for triggering and controlling the flow of paint through the fluid passage. A typical prior art hand-held airless paint sprayer is shown in FIG. 1.

SUMMARY

According to one embodiment of the invention, an airless paint sprayer for spraying a fluid comprises a main housing, a handle, a paint cup and a mechanical actuator. The main housing comprises an electrical housing having a motor and a switch, and a pump housing comprising a pump and a fluid passage. The pump is configured to pump a fluid through the fluid passage and the motor is configured to operate the pump. The handle is coupled to the main housing and the paint cup is coupled to the handle for the storage of a fluid, with the paint cup being in communication with the fluid passage. The mechanical actuator is coupled to the pump housing for operating the motor. The actuator has a first portion positioned in the vicinity of the exterior of the pump housing and a second portion that extends into the pump housing. The second portion is configured to engage the switch in the electrical housing to operate the motor.

In another embodiment, a mechanical actuator for an airless paint sprayer having a pump housing, an electrical housing, and a handle comprises an actuator first portion and an actuator second portion. The pump housing of the paint sprayer is coupled to the electrical housing and the electrical housing comprises a motor and a switch. The actuator first portion is positioned outside the pump and electrical housings. The actuator second portion has a first end and a second end, with the first end coupled to the actuator first portion and the second end extending into the pump housing for communication with the switch of the electrical housing. The actuator first portion is movable from a first position to a second position and movement of the actuator first portion moves the actuator second portion from a first position to a second position in the pump housing. The actuator second portion engages the electrical switch of the electrical housing when in the second position to activate the motor.

According to yet another embodiment, a handle for an airless paint sprayer comprises an elongated member having a top end and a bottom end. The elongated member has a generally rectangular cross-section at the top end and a generally circular cross-section at the bottom end. A first transition zone is positioned between the top and bottom ends where the cross-section transitions from the generally rectangular cross-section to the generally circular cross-section.

BRIEF DESCRIPTION OF THE DRAWING FIGURES.

DETAILED DESCRIPTION OF THE INVENTION

The paint sprayer of the present invention is utilized in spraying paint, stain, or other viscous materials onto a surface, while directing stresses related to holding and activating the applicator to stronger muscles of the arm, including the bicep and tricep muscles. This redirection of stress, in turn, significantly reduces the fatigue of the user during use and allows for better control during the paint application process. The invention is primarily directed to airless paint spray gun applications, although it may have uses in other paint applications. The paint sprayer of the invention creates a number of ergonomic benefits, including: 1) changing the center of gravity of the spray gun relative to the current art so that the sprayer's weight acts on the larger and stronger muscles of the arm (bicep, tricep) versus the wrist muscles, as is done in the current art; 2) evenly distributing and balancing the weight of the sprayer, whereas the current art distributes the paint at a great distance from the handle and the center of gravity; 3) and shaping the handle for a comfortable formed fit to the hand of a user, whereas the prior art tends to be rectangular in shape and has uncomfortable edges.

Figure 1:
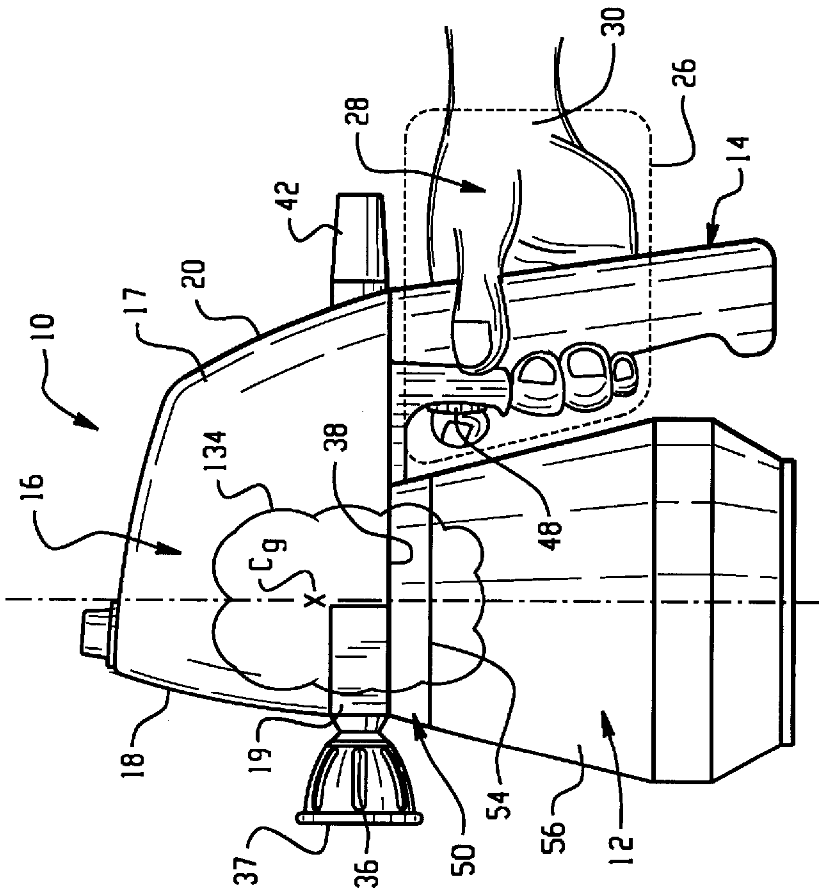
Fig. 1 PRIOR ART
FIG. 1 is a side view of a prior art paint sprayer.

As shown in FIG. 1, prior art paint sprayers 10 typically utilize a paint cup 12 and a handle 14 that are positioned directly under a main housing 16, with the paint cup 12 being positioned at a forward end 18 of the main housing 16 and the handle 14 being positioned at a rear end 20 of the main housing 16. The center of gravity Cg tends to be positioned in the vicinity of the forward end 18 of the housing 16, both when the paint cup 12 is full and when the paint cup 12 is empty. The position of the Cg is driven in part by the location of the components under the housing 16, including the electric motor 22 and pump 24, which tend to be distributed toward the forward end 18 of the housing 16. The user grasps the handle 14 of the paint sprayer 10 at the rear end 20 of the housing 16 in a gripping zone 26, which is defined by the user's hand 28 and wrist 30 when in engagement with the handle 14. As is evident, since the center of gravity Cg is positioned toward the forward end 18 of the paint sprayer 10, the user is required to exert a rotational force on the paint sprayer 10 to maintain it in proper position for spraying. Such exertion can cause weariness of the user, particularly in the muscles of the hand 28 and wrist 30.

Figure 2:
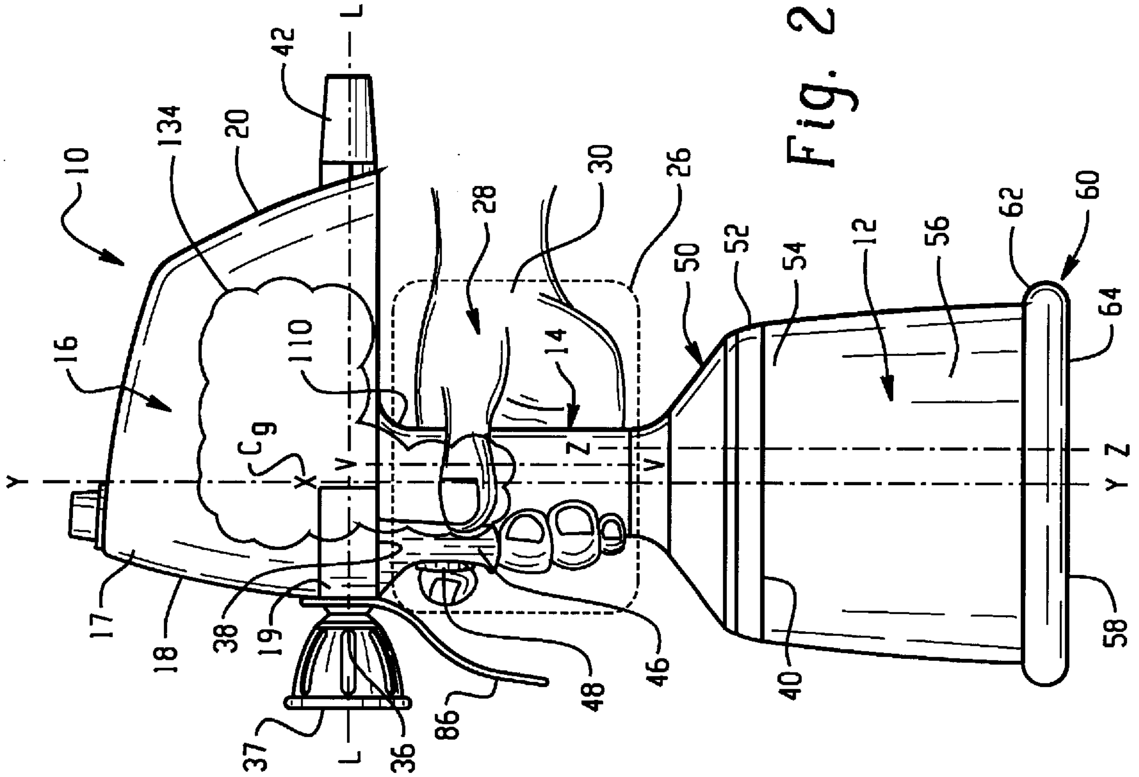
FIG. 2 is a side view of a paint sprayer according to the invention.
Figure 3:
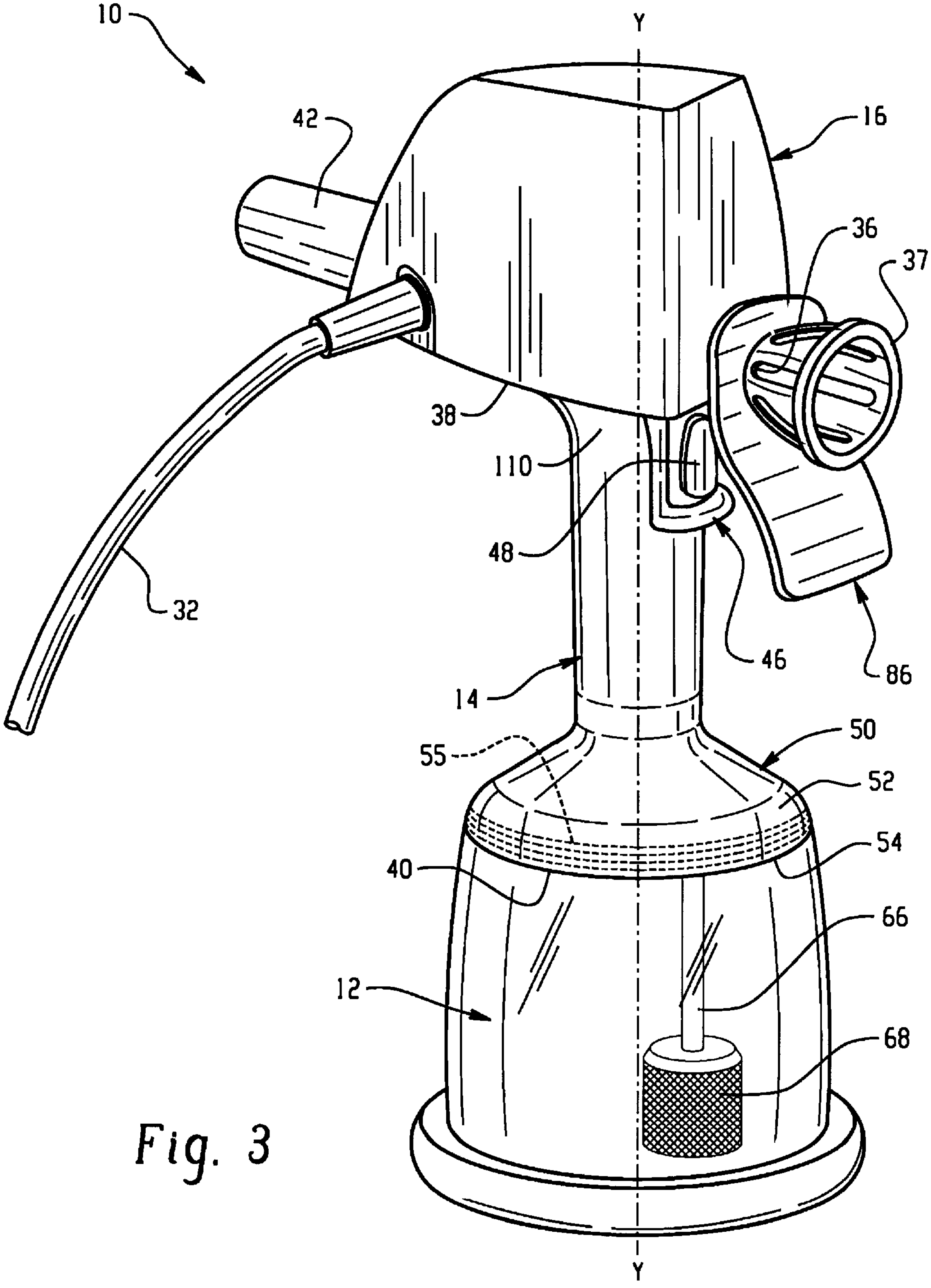
FIG. 3 is a perspective view of the paint sprayer of FIG. 2.

The present invention, as shown in FIGS. 2 and 3, reconfigures the parts of the paint prayer 10 so that the main housing 16, paint cup 12, and handle 14 are vertically aligned with one another. This vertical alignment distributes the weight so that it more closely aligns with the sprayer's center of gravity Cg. As a result, stresses on the user are minimized as compared to prior art paint sprayers, since the user is not required to constantly exert a force to keep the paint sprayer housing level.

As shown in FIG. 2, a gripping zone 26 for the present invention is defined by the user's hand when it grasps the handle 14 of the paint sprayer 10. The gripping zone 26 comprises the entire hand and wrist area under the main housing 16. In a preferred embodiment, the paint sprayer 10 of the present invention is designed so that the center of gravity Cg of the paint sprayer 10, whether empty or full, vertically aligns with the gripping zone 26. The gripping zone 26 is preferably designed so that all user's hand sizes are encompassed within the zone.

Referring to FIGS. 2 and 3, the main housing 16 of the present invention includes an electrical housing 17 that houses an electric motor 22. The motor 22 is powered by a power cord 32 that extends outwardly from the housing 16. As shown in FIG. 3, in a preferred embodiment, the power cord 32 extends outwardly from the side of the housing 16, although placement of the cord 32 is not critical to the invention. It may be positioned at any number of places, as long as it does not interfere with operation of the sprayer 10.

The main housing 16 also includes a pump housing 19. The pump housing 19 houses a pump 24 that comprises a cylinder 78, a piston 80, and a fluid passage 34 through which paint or other fluids may flow. A tip 36 is connected to the pump housing 19 at one end of the fluid passage 34. Paint is pumped through the fluid passage 34 by the pump 24, which is operated by the electric motor 22, and is sprayed through the tip 36 in a pattern, as is typical of paint sprayers. A tip guard 37 surrounds the tip in a conventional manner and is utilized to deter injury to the operator, for example, from injection of paint into the skin.

A handle 14 is attached to the bottom 38 of the main housing 16 and a paint cup 12 is attached to the bottom 40 of the handle. In a preferred embodiment, the handle 14 is attached to the pump housing 19.

A control knob 42 is positioned at a rear end of the housing 16. This knob 42 can be used to adjust the amount of paint that flows through the fluid passage 34. The knob 42 may be rotatable, is preferably easy to operate, and maintains its position after being set.

An actuator 46 is coupled to the handle 14 and/or the housing 16. The actuator 46 is preferably a mechanical actuator coupled to an electrical switch 136. The mechanical actuator extends through the pump housing to the electrical housing. The electrical switch 136 is positioned inside the electrical housing 17 and sealed from the pump housing 19. The mechanical actuator 46 includes a button 48 that extends outwardly from the main housing 16 so that the user may press the button to operate the motor 22 and the pump 24. The actuator 46, in a preferred embodiment, is positioned between the tip 36 and the handle 14 below the pump housing 19, and is configured to be easily and ergonomically operable by a user in the gripping zone 26.

A lid structure 50 is coupled to the lower end 40 of the handle 14. The lid 50 has a generally frustoconical shape, with the larger portion of the cone being at the bottom. A rim 52 is formed at the bottom of the cone and includes an attachment mechanism (not shown) for coupling to the paint cup 12. The attachment mechanism may include a screw thread, a snap fixture, or any other attachment mechanism suitable for use in connecting the paint cup 12 to the handle 14.

The paint cup 12 has an open upper end 54 that is removable from the lid structure 50 of the handle. An outer wall surrounds the paint cup 12 and a base surface 58 is positioned at the bottom of the paint cup. A preferred attachment technique is to screw the cup 12 onto the rim 52 of handle 14 utilizing mating screw threads 55 that are positioned on both the upper end of the paint cup and the inner side of the rim 52 of the handle 14, as known by those of skill in the art, although other attachment techniques known to those of skill in the art may also be utilized. The wall 56 of the paint cup 12 may be cylindrical, frustoconical, or the like, as long as it has an opening at the top and a base surface 58 at the bottom. The paint cup 12 also serves as a base for the entire sprayer 10, so that the sprayer can rest on an underlying surface. In addition, the paint cup 12 preferably has a base surface 58 upon which the cup may rest during filling (after the cup 12 has been removed from the remainder of the sprayer). In a preferred embodiment, as shown in FIGS. 2 and 3, the base surface 58 is slightly enlarged relative to the wall 56 of the paint cup. The base surface 58 may be formed as a separate piece that is connected to the wall 56 by press fit, wedge fit, gluing, welding, or other known attachment techniques. For example, in a preferred embodiment, as shown in FIGS. 2 and 3, the paint cup 12 may be formed having an upper part that forms the wall 56 and a separate lower part 60 that is connected to the base surface 58 of the wall 56. The separately formed lower part 60 also has an upwardly extending wall 62 and a base surface 64 is attached to the base surface 58 of the upper part to form a two part paint cup. In a preferred embodiment, the wall 56 of the paint cup is transparent while the base 60 of the paint cup 12 is made of a differently colored opaque material.

The paint cup 12 may be made of a polymer, such as a low density polyethylene or polypropylene. Other materials may also be used in making the cup 12, the invention not being limited to a particular material. Screw threads or other attachment mechanisms (not shown) are preferably positioned around the upper end 54 of the paint cup 12 for mating with the screw threads on the lid 50 of the handle 14. As shown, the paint cup upper end 54 preferably seats within the rim 52 of the lid 50.

Referring to FIG. 3, the handle 14 is preferably hollow. An intake suction tube 66 extends from the fluid passage 34 in the pump housing 19, through the handle 14, and into the paint cup 12. The intake tube 66 may be rigid or flexible, as long as the tube extends to the bottom of the paint cup 12 and does not curl upwardly. A filter 68 is shown positioned at the bottom end of the intake tube 66 in the paint cup 12 for use in filtering out any debris in the fluid in the paint cup 12. The intake tube 66 is preferably removable from the handle 14 and paint cup 12 for cleaning purposes and may be positioned in an intake opening (not shown) in the bottom of the housing. The intake opening is at one end of the fluid passage 34 through the pump housing 19. A return opening (not shown) may also be positioned inside the handle 14 for handling any fluid that bypasses the components of the pump 24 and does not exit the tip 36. This bypass flow is returned to the paint cup 12 by the return opening, as known by those of skill in the art. The return opening may be positioned in the vicinity where the handle 14 meets the pump housing 19, or an additional tube may be positioned in the return opening (not shown) to extend into and/or through the handle 14 for assisting in directing the fluid back to the paint cup 12.

Figure 4:
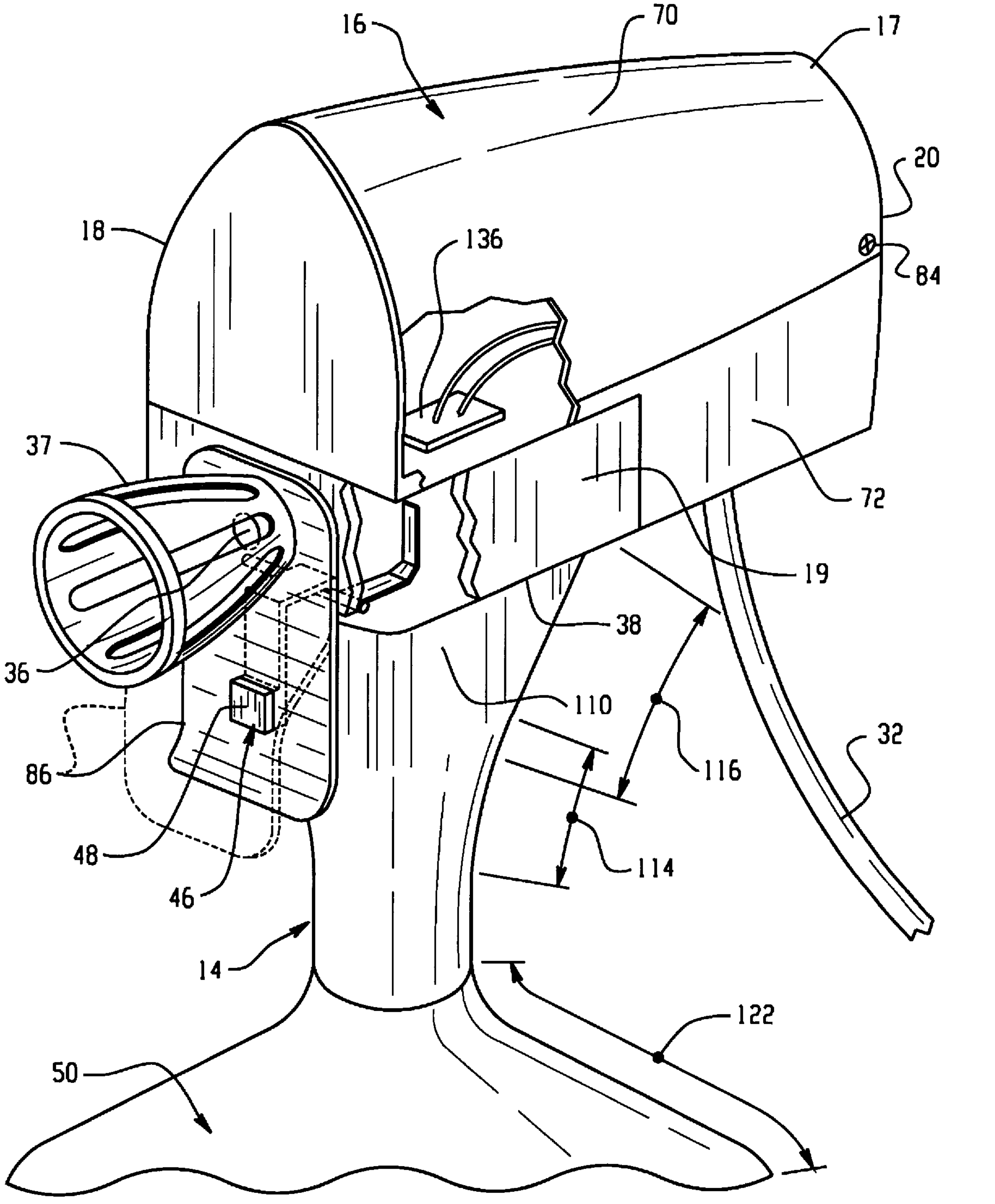
FIG. 4 is an expanded perspective view of the housing and handle of the paint sprayer shown in FIG. 2.
Figure 5:
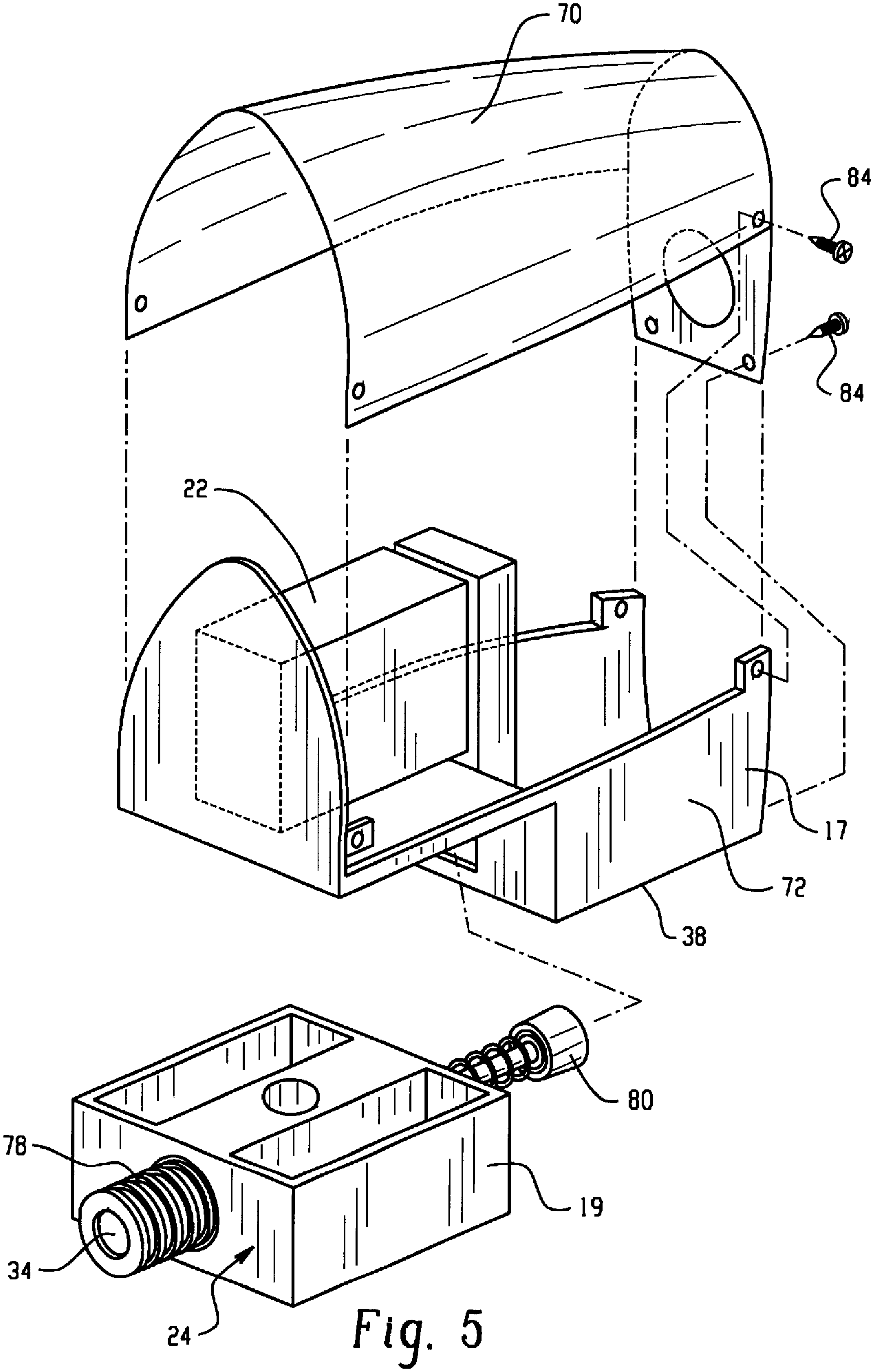
FIG. 5 is an exploded view of the housing of the paint sprayer shown in FIG. 4.

FIGS. 4 and 5 depict the main housing 16 in greater detail. In a preferred embodiment, as discussed above, the main housing 16 includes an electrical housing 17 and a pump housing 19. The electrical housing includes a motor cover 70, a motor carriage 72, and a motor 22. The motor 22 is positioned on the motor carriage 72. In one embodiment, the motor 22 is an electromagnetic motor, such as a 60 watt or higher electromagnetic motor. The cover 70 is preferably fastened to the motor carriage 72 with screws 84 in a conventional manner.

The pump housing 19 includes a cylinder 78 and a piston 80. The motor 22 is coupled to the cylinder 78 and moves the piston 80 back and forth to pump fluid through the fluid passage 34, which extends through the pump housing 19. The pump housing 19 is attached to the electrical housing 17 by screws or other known fastening means. The pump housing 19 and electrical housing 17 are configured and oriented so that the "wet" part of the sprayer (the pump housing 19) is maintained separately from the "dry" part of the sprayer (the electrical housing 17). It is preferred that the housings are maintained separately from one another to deter fluid in the pump housing 19 from entering into and possibly damaging the electrical components in the electrical housing 17. In addition, the pump housing 19 is removable from the electrical housing 17 for cleaning purposes. The pump housing 19 can be submerged in a cleaning solution while the electrical housing 17 is maintained dry. While a particular configuration for the main housing is depicted herein, other embodiments of the main housing 16 are also applicable to the present invention.

Figure 6:
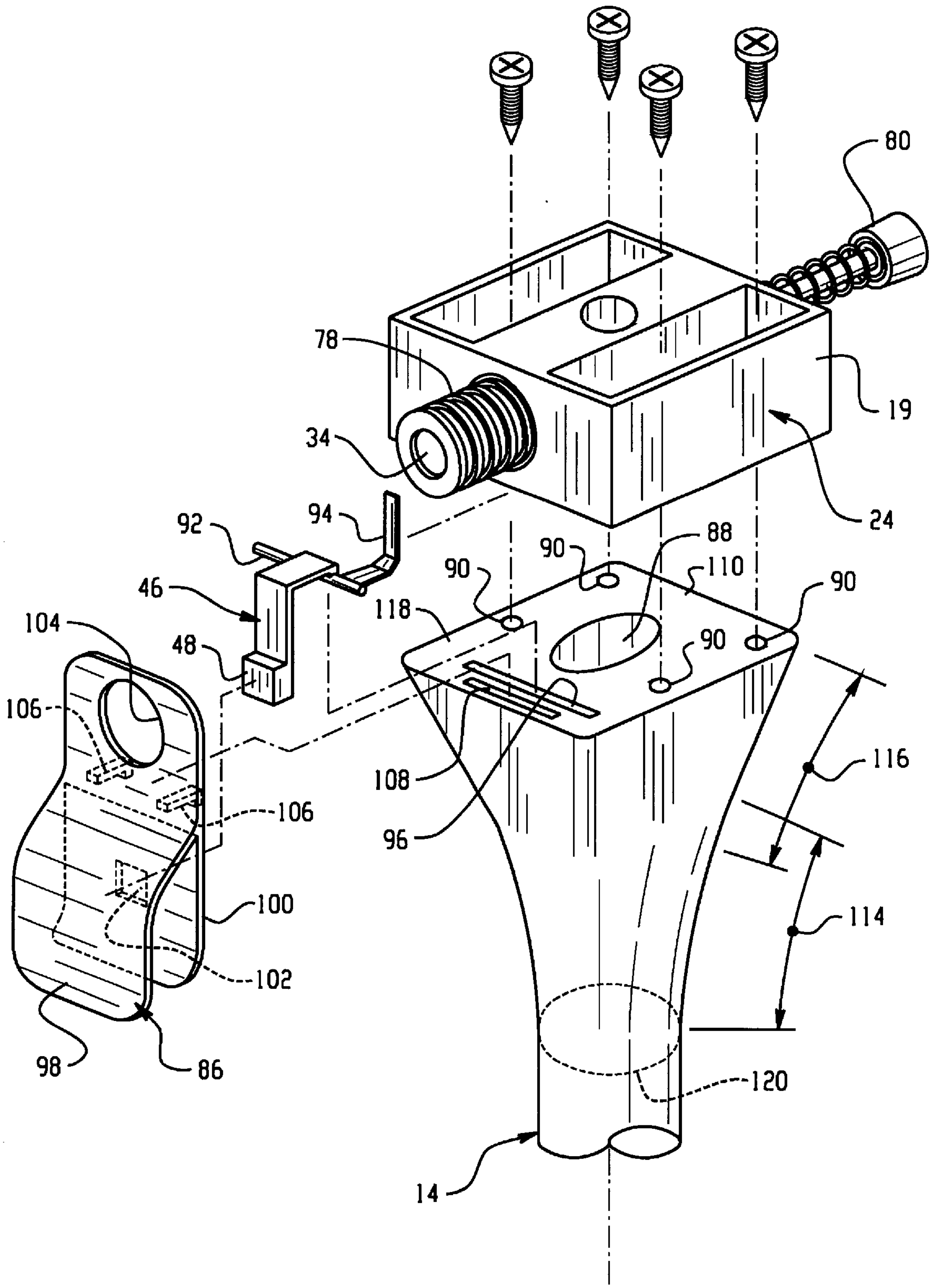
FIG. 6 is an exploded view of the actuator assembly and drip guard of the paint sprayer shown in FIG. 4.

As shown in FIG. 6, the handle 14 is positioned beneath the pump housing 19 such that the intake tube 66 from the paint cup 12 communicates fluid to the pump 24 through the opening 88 in the handle 14. In a preferred embodiment, the paint cup 12 is centered beneath the handle 14 and the paint cup 12 and/or handle 14 may be symmetrically shaped. The handle 14 includes attachment points 90 for connecting the handle 14 to the main housing 16. As shown in FIG. 6, the handle 14 may be connected directly to the pump housing 19. The handle 14 may be attached by other means, as long as the intake tube 66 from the paint cup 12 is in communication with the fluid passage 34.

The actuator 46, shown in FIGS. 4 and 6, is a mechanical actuator that extends through the pump housing 19 to the electrical housing 17. The actuator 46 has a button 48 at one end that is connected to a pivot bar 92, and an extension arm 94 that extends outwardly toward the rear end 20 of the housing from the pivot bar 92. The pivot bar 92 is seated in a channel 96 defined in the upper end of the handle 14. The extension arm 94 extends through the pump housing 19 and is configured to engage a switch 136 in the electrical housing 17 for activating the motor 22. The switch 136 may be a microswitch that pivots or rocks when engaged by the extension arm 94. The switch 136 may include a seal for sealing the electrical housing 17 from the pump housing around the switch. The actuator 46 pivots or rocks when the button 48 is engaged by a user to operate the switch 136. While one embodiment of the actuator is shown and described, other configurations of the actuator are also within the scope of the claimed invention.

FIGS. 4 and 6 also depict a drip guard 86 according to the invention. A drip guard 86 is preferably positioned under the tip 36 for deterring paint from contacting the handle 14 and the actuator 46. In particular, drip guard 86 is used to deter paint from contacting any of the electrical components of the paint sprayer 10. The drip guard 86 is coupled to the main housing 16 and/or the handle 14. The drip guard 86 has two separate flanges 98, 100, a first 98 of which extends under the tip 36 and a second 100 of which is positioned over the actuator 46 so that the button 48 of the actuator 46 extends through a hole 102 in the second flange 100. The drip guard 86 includes a circular attachment hole 104 for positioning around the cylinder 78 of the pump housing 19. In addition, the drip guard 86 includes an appendage 106 which extends outwardly below the circular hole 104. The appendage 106 is engaged within a slot 108 in the handle 14. The combination of the appendage 106 and the circular attachment hole 104 assist in maintaining the drip guard 86 in position on the paint sprayer 10. As discussed, the first flange 98 of the drip guard 86 is curved and extends outwardly from the housing 16 under the tip 36 adjacent the actuator 46 and assists in deterring paint from contacting the handle area of the paint sprayer 10. The second flange 100 of the drip guard 86 extends around the actuator button 48 and assists in deterring paint from entering the actuator 46.

Figure 7:
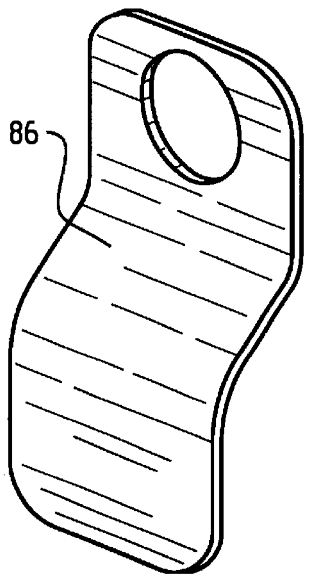
FIG. 7 is a perspective view of a drip guard for use with the paint sprayer shown in FIG. 2.

An alternative embodiment of the drip guard 86 is shown in FIG. 7 as only comprising the first flange portion 98. This drip guard 86 is similarly positioned beneath the tip 36 and is designed to deter paint from dripping from the tip 36 and contacting the handle 14 (and thus the user's hand and actuator 46 during paint application. Other drip guards may also be designed for use with the present invention, the invention not being limited to the designs shown herein. The drip guard is designed to be positioned between the tip 36 and the actuator 46 and is preferably positioned below the tip 36 and adjacent the actuator 46, handle 14, or main housing 16 for deterring the flow of paint onto the handle 14 and actuator 46.

Referring again to FIG. 6, the handle 14 of the present design is ergonomically engineered for comfort to both male and female users during both use and transport. In addition, the actuator 46 on the handle 14 is ergonomically designed to allow operators of many sizes ease in operating the actuator 46 without requiring strain, unusual motion, or unnecessary finger extension. The handle 14 is also conducive to use by both left and right-handed users, and may include a foam cushion (not shown).

In particular, the handle 14 has a varied cross-section that has a generally rectangular shape 118 at the upper end 110 that transitions to a circular shape at the lower end 112. The rectangular shape 118 transitions to a circular shape 120 in a first transition zone 114, as shown in FIGS. 4 and 6. In addition, the generally rectangular cross-section 118 at the upper end 110 has a varying-sized cross-section. The generally rectangular cross-section 118 at the upper end 110 of the handle 14 has a larger cross-sectional shape than the generally rectangular cross-section 118 below the upper part. The larger cross-section transitions to a smaller cross-section in a second transition zone 116, as shown in FIGS. 4 and 6.

Furthermore, the circular cross-sectional shape 120 at the lower end 112 of the handle 14, where the handle 14 joins with the lid 50, also includes a transition zone—referred to as the third transition zone 122, as shown in FIG. 4. This third transition zone 122 transitions from the lower end 112 of the handle 14 to the rim 52 of the lid 50, with the smaller-diameter circular cross-section occurring toward the lower end 112 of the handle 14 and the larger diameter circular cross-section 120 occurring toward the rim 52 of the lid 50. These transition zones 114, 116, 122 assist in providing a comfortable handle 14 for the varying hand sizes of the user. For example, a smaller handed user would likely only contact the lower part of the rectangular cross-section and the intermediate part of the handle where the circular cross-section has a generally constant diameter. A very large-handed user may contact the entire length of the handle 14, including the upper part of the lid 50. As a result, both the smaller and larger handed user's are comfortably accommodated. In addition, the handle 14 is a mirror image of itself on either side, so that no variation is provided based upon left or right handed users. Thus, both users may use the handle in comfort. It should be noted that while a specific configuration for the handle 14 is shown and described, variations of the transition zones 114, 116, 122 are also within the scope of the claimed invention. In particular, the size and location of the transition zones 114, 116, 122 may vary along the length of the handle 14. In addition, the shape of the handle may vary.

Figure 8:
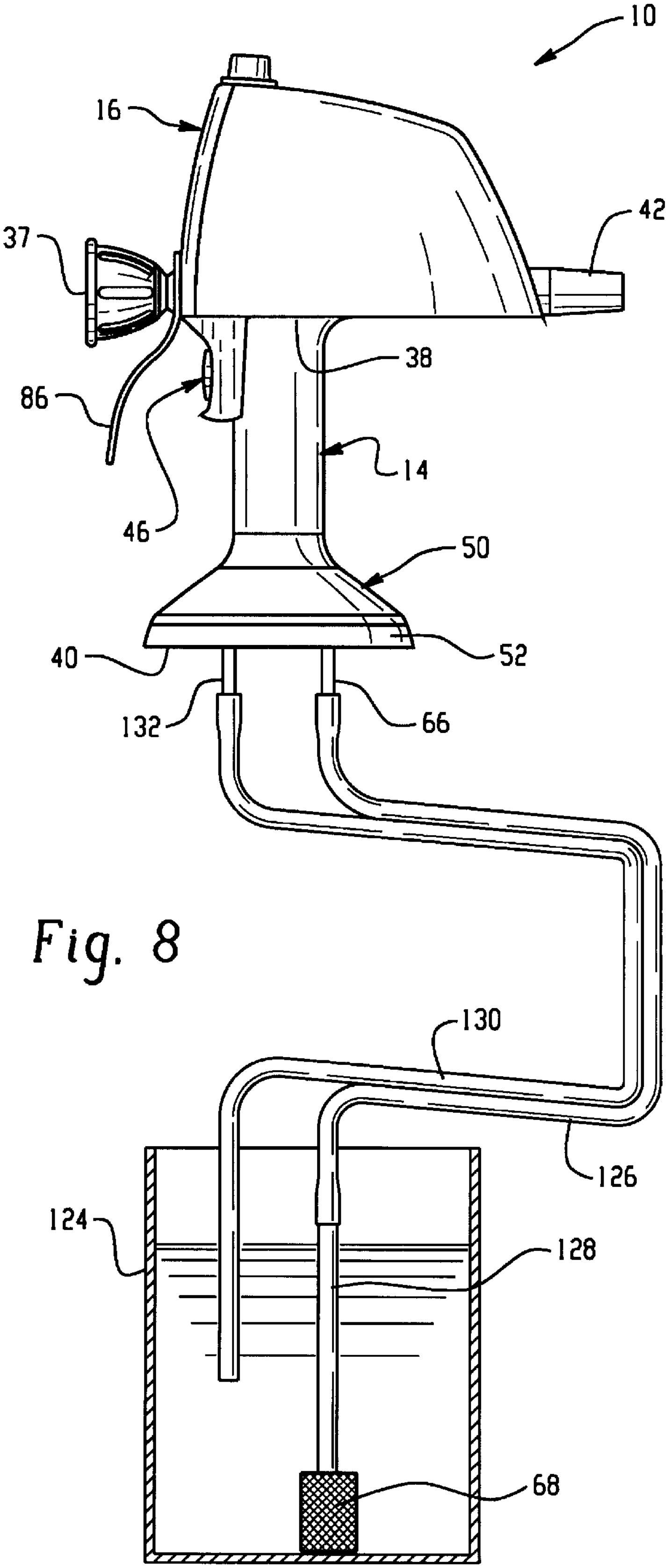
FIG. 8 is a side view of an alternative embodiment of the invention where an accessory hose is used with the paint sprayer.

FIG. 8 shows an alternative embodiment of the invention utilizing the main housing 16 and handle 14, as described above in connection with FIGS. 2–7. This embodiment, however, does not utilize a paint cup 12. Instead, it utilizes a hose structure that connects the intake tube 66 to a separate paint bucket 124. The intake tube 66 is coupled to an intake hose 126 that extends from the intake tube 66 to a paint bucket 124, or other paint source. A rigid tube 128 and filter structure 68 may be coupled to the end of the intake hose 126 and preferably extend to the bottom of the paint bucket 124. In addition, a return hose 130 is shown extending from a return tube 132 that extends through the handle. The return hose is used to return paint from the return opening back to the paint bucket 124. The return hose 130 is shown as connected to a rigid tube 132 that extends through the handle 14 to the return opening. Other types of attachments may also be utilized. For instance, the return tube 132 can be removable, or a permanently affixed return tube 132 can be attached to the return outlet so that the return hose 130 may couple to the end of the tube 132. The return hose 130 and intake hose 126 may be formed as a single hose that is joined together, as shown, or may be two separate hoses. Furthermore, in one embodiment, the sprayer does not utilize a return opening.

Referring again to FIG. 2, the center of gravity Cg of the paint sprayer 10 is preferably maintained in a Cg region 134 that is positioned over or within the gripping zone 26. In a preferred embodiment, represented by the X in FIG. 2, the center of gravity Cg is aligned with a longitudinal axis Y—Y of the handle 14 and paint cup 12. The paint cup 12 may have an axis Z—Z other than the longitudinal axis Y—Y and the handle 14 may have an axis V—V other than the longitudinal axis Y—Y, and these axes may also be aligned with the center of gravity Cg of the paint sprayer 10. In addition, the main housing 16 has a longitudinal axis L—L that extends front to back. In a preferred embodiment, the axis Z—Z of the paint cup 12 and the axis V—V of the handle 14 are perpendicular to the longitudinal axis L—L of the housing. Even more preferably, the axis Y—Y of the paint cup 12 and handle 14 are perpendicular to the longitudinal axis L—L of the main housing 16.

The center of gravity will vary within the Cg region 134 depending upon whether the paint cup 12 is full of fluid or empty. The Cg may vary slightly as the paint is used from the paint cup 12. It is preferred that the Cg is positioned so that there will be little variation in Cg as paint is used from the cup 12. The Cg of the paint sprayer 10 may be manipulated by moving the components within the main housing 16. For instance, the motor 22 may be moved around within the electrical housing 17 to modify the position of the Cg. Other components may also be moved around to alter Cg, if so desired.

In a preferred embodiment, the center of gravity of the sprayer 10 is designed so that the sprayer 10 may sit on a flat surface without tipping over, regardless of the amount of paint in the paint cup 12, and is resistant to tipping caused by accidental bumping. The center of gravity may take into account accessories, including the sprayer 10 itself, a hose 126, 130 (should the sprayer 10 be used with an accessory hose instead of the paint cup 12), and the power cord 32. In addition, the center of gravity is preferably positioned so that the paint sprayer 10 is balanced when in the hand of a user.

It is preferred that the pump 24 is designed to prime on the first try with every use. In addition, it is preferred that the internal fluid passage 34 is smooth and has no trap points. A smooth internal fluid passage 34 will make it easier to clean the sprayer 10 and result in greater overall customer satisfaction since the sprayer 10 will be more likely to operate properly during subsequent uses.

In use, the user unscrews the paint cup 12 from the sprayer 10 and fills it with paint. After plugging the power cord 32 into an electrical outlet, the user grips the handle 14 and activates the sprayer 10 by pressing the actuator button 48. The actuator 46 pivots to activate the switch 136 and the motor 22. Spray intensity may be adjusted by turning the control knob 42 on the rear end 20 of the sprayer housing 16. While pressing the actuator button 48, the user moves his/her arm back and forth to spray paint onto the desired surface.

The sprayer 10 may be cleaned by removing and emptying the paint cup 12 from the lid 50, filling the paint cup 12 with clean water or cleaning solution, reattaching the paint cup 12 to the lid 50, and spraying the water or solution through the fluid passage 34 out the tip 36. Alternatively, the pump housing 19 can be removed from the main housing 16 and soaked or run under water. Typical cleaning solutions include water, paint thinner (mineral spirits), lacquer thinner, denatured alcohol, turpentine, and other paint solvents.

The various parts of the paint sprayer 10, such as the tip guard 37, housing 16, drip guard 86, handle 14, power cord 32, and other parts are shown as having a particular configuration. The configurations shown are for illustration purposes only, the scope of the invention being defined by the appended claims and not limited to any of the particularly shown embodiments.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A handle for an airless paint sprayer comprising:

an elongated member configured in a mirror image of itself on either side, and having a top end and a bottom end, with a gripping zone extending between the top and bottom ends, said elongated member having a generally rectangular cross-section at the top end and a generally circular cross-section at the bottom end, with a first transition zone positioned between the top and bottom ends where the cross-section transitions from the generally rectangular cross-section to the generally circular cross-section.

2. The handle of claim 1, further comprising attachment points at at least the top end of the elongated member, wherein the attachment points are for mating the handle to a housing of an airless paint sprayer.

3. The handle of claim 1, wherein the generally rectangular cross-section is rectangular and the generally circular cross-section is circular.

4. The handle of claim 1, further comprising at least one attachment point at the bottom end of the elongated member for coupling with a paint cup.

5. A handle for an airless paint sprayer comprising:

an elongated member having a top end and a bottom end, with a gripping zone extending between the top and bottom ends, said elongated member having a generally rectangular cross-section at the top end and a generally circular cross-section at the bottom end, with a first transition zone positioned between the top and bottom ends where the cross-section transitions from the generally rectangular cross-section to the generally circular cross-section, and with a second transition zone in the vicinity of the top end of the elongated member, the second transition zone having a larger cross-section at the top of the second transition zone than at the bottom of the second transition zone, both cross-sections of which are generally rectangular.

6. The handle of claim 5, further comprising a third transition zone in the vicinity of the bottom end of the elongated member, the third transition zone having a larger cross-section at the bottom of the third transition zone than at the top of the third transition zone, both cross-sections of which are generally circular.

7. A handle for an airless paint sprayer comprising:

an elongated member having a top end and a bottom end, with a gripping zone extending between the top and bottom ends, said elongated member having a generally rectangular cross-section at the top end and a generally circular cross-section at the bottom end, with a first transition zone positioned between the top and bottom ends where the cross-section transitions from the generally rectangular cross-section to the generally circular cross-section, and with a third transition zone in the vicinity of the bottom end of the elongated member, the third transition zone having a larger cross-section at the bottom of the third transition zone than at the top of the third transition zone, both cross-sections of which are generally circular.

8. The handle of claim 7, wherein a lid portion having a rim is positioned at the bottom end of the elongated member and the rim of the lid portion is for attaching the handle to a paint cup, with the larger generally circular cross-section of the third transition zone being positioned at the rim of the lid portion.

9. The handle of claim 8, wherein the lid portion includes a frustoconical upper portion and a generally cylindrical lower portion, with the screw threads being positioned on the lower portion.

10. A handle for an airless paint sprayer comprising:

an elongated member having a top end and a bottom end, with a gripping zone extending between the top and bottom ends, said elongated member having a generally rectangular cross-section at the top end and a generally circular cross-section at the bottom end, with a first transition zone positioned between the top and bottom ends where the cross-section transitions from the generally rectangular cross-section to the generally circular cross-section; and at least one attachment point at the bottom end of the elongated member for coupling with a paint cup, said attachment point at the bottom end of the elongated member including a lid portion with a rim, said rim having screw threads positioned thereon for mating with screw threads of a paint cup to attach a paint cup to the handle.

11. A handle for an airless paint sprayer comprising:

an elongated member having a top end and a bottom end, with a gripping zone extending between the top and bottom ends, said elongated member having a generally rectangular cross-section at the top end and a generally circular cross-section at the bottom end, with a first transition zone positioned between the top and bottom ends where the cross-section transitions from the generally rectangular cross-section to the generally circular cross-section; and a lid coupled in the vicinity of the bottom end of the elongated member.

12. The handle of claim 11, wherein the lid is integral with the elongated member.

13. The handle of claim 11, wherein the lid has a circular cross-section.

* * * * *